United States Patent

Argabright et al.

[11] 4,006,098
[45] Feb. 1, 1977

[54] POLYISOCYANURATE SALT EMULSIFYING AGENTS AND DERIVATIVES

[75] Inventors: Perry A. Argabright, Larkspur; C. Travis Presley, Littleton; Charles B. Wenger, Denver, all of Colo.

[73] Assignee: Marathon Oil Company, Findlay, Ohio

[22] Filed: Sept. 13, 1974

[21] Appl. No.: 505,716

Related U.S. Application Data

[63] Continuation-in-part of Ser. No. 224,905, Feb. 9, 1972.

[52] U.S. Cl. .............................. 252/312; 252/356; 252/357
[51] Int. Cl.² ................. B01J 13/00; B01F 17/30; B01F 17/16
[58] Field of Search .................. 252/312, 356, 357

[56] References Cited

UNITED STATES PATENTS

| | | | |
|---|---|---|---|
| 3,072,654 | 1/1963 | Vazopolos | 260/248 |
| 3,272,813 | 9/1966 | Symes | 260/248 |
| 3,489,696 | 1/1970 | Miller | 260/2.5 |
| 3,573,259 | 3/1971 | Argabright | 260/77.5 |
| 3,766,086 | 10/1973 | Argabright | 252/312 |
| 3,779,940 | 12/1973 | Argabright | 252/312 |

FOREIGN PATENTS OR APPLICATIONS 2,250,579  8/1973  Germany

*Primary Examiner*—Samuel W. Engle
*Assistant Examiner*—Donald P. Walsh
*Attorney, Agent, or Firm*—Joseph C. Herring; Jack L. Hummel

[57] ABSTRACT

A mixture of molecules containing all of the following groups exhibit surface activity: isocyanurate, metal-substituted isocyanurate, and at least one group selected from the class consisting of a monovalent organic radical selected from the following: isocyanate ($-NCO$), urethane ($-NHCO_2R'$), urea ($-NHCONHR'$), amino ($-NH_2$, $-NHR'$, or $-NR_2'$).

7 Claims, 3 Drawing Figures

POLYISOCYANURATE SALT EMULSIFYING AGENTS AND DERIVATIVES

This application is a continuation-in-part of our co-pending U.S. patent application Ser. No. 224,905 filed Feb. 9, 1972.

BACKGROUND OF THE INVENTION

1. Field of the Invention

The present invention relates to compositions-surface-active generally classified in the U.S. Patent Office in Class 252, subclasses-351 and −353 through -358.

2. Description of the Prior Art

A search in the U.S. Patent Office disclosed the following prior art: U.S. Pat. No. 3,072,654 teaches calcium di(dichloroisocyanurate) in bleaching and cleaning compositions; U.S. Pat. No. 3,272,813 complexes chloroisocyanurates with potassium to make bleaching compositions (see Col. 16, lines 63-70); and U.S. Pat. No. 3,489,696 forms polyimides from isocyanates and polycarboxylic acids and mentions use of biuret triisocyanate at Col. 5, line 62.

SUMMARY OF THE INVENTION

General Statement of the Invention

The present invention relates to a new class of compounds which are useful as emulsifying agents, e.g., in forming dispersions and emulsions. These compounds are characterized by containing in a single molecule all of the following groups:

isocyanurate:

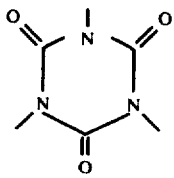

isocyanurate salt:

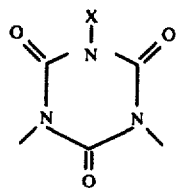

and at least one group selected from the class consisting of: a monovalent organic radical selected from the following: urethane (—NHCO$_2$R'), urea (—NH-CONHR'), amino (—NH$_2$, —NHR' or —NR$_2$').

The compounds of the present invention have the general structure shown in FIG. 1; where:

- R = divalent hydrocarbon or substituted hydrocarbon radical, as described below and exemplified in FIG. 2,
- X = a metal or quaternary ammonium (which for the purposes of this invention, acts like a metal), or a combination thereof. Particularly preferred are quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Cu, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.
- A = A monovalent organic radical selected from the following: urethane (—NHCO$_2$R'), urea (—NH-CONHR'), amino (—NH$_2$, —NHR' or —NR$_2$')
- R' = monovalent hydrocarbon or substituted hydrocarbon radical, as discussed below;
- M = average number of trisubstituted isocyanurate rings and is a positive integer from 0 to about 400, and most preferably from 0 to about 200,
- N = average number of isocyanurate salt groups and is a positive integer from 1 to about 10,000 more preferably from 1 to about 1,000, and most preferably from 2 to about 100,
- 2M+N+1 = average number of divalent R groups and is a positive integer from 2 to about 11,000, more preferably from 3 to about 1,100, and most preferably from 4 to about 140,
- M+2 = average number of A groups and is a positive integer from 2 to about 400, more preferably from 2 to about 200, and most preferably from 2 to about 100;

and wherein there are no N-to-N bonds, no A-to-N bonds, no A-to-A bonds, and no R-to-R bonds.

R preferably contains 2 to 40, more preferably 2 to 30, and most preferably 2 to 18 carbon atoms. R' preferably contains 1 to 40 carbon atoms, more preferably 1 to 20 carbon atoms, and most preferably 1

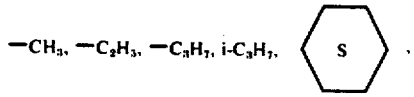

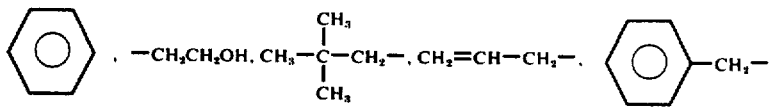

etc.

R and/or R' can be substituted with groups that do not interfere in the product's subsequent utility or in its preparation. Examples of such non-interfering groups are: —NO$_2$, Cl, Br, I, CN, —CO$_2$R'', —CO—R'', —O—R'',—SR'', NR$_2$'' —CONR$_2$'', —SO$_3$R'', —SO$_2$—, —SO—, phenyl naphthyl, alkyl (1-40 carbon atoms), PO$_3$R'', cyclohexyl, cyclopropyl, polymethylene (e.g., tetramethylene),

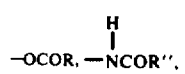

etc. where R" may be hydrogen, lower alkyl (e.g., ethyl, hexyl), or aryl (e.g., monovalent radicals corresponding to the aryl radicals described in FIG. 2). The examples of R (shown in FIG. 2) are set forth for purposes of elucidation, not restriction.

It will be recognized that the values of M and N, described above are on the basis of the integers which will be used to describe a single molecule. In actual practice, the invention will involve mixtures of molecules of the general form described above. Thus, the average value of M for the mixture may be from about 1 to about 350, more preferably from about 1 to 200, and most preferably from about 1 to 100; the value of N may be from about 1 to 9,000, more preferably from 1 to 800, and most preferably from 1 to 100.

UTILITY OF THE INVENTION

The present invention relates to a new class of emulsifying agents, their preparation, and processes for their use. For example, the compounds of the present invention may be added to immiscible mixtures of water and organic compounds, e.g., equal parts by volume of water and a hydrocarbon and the resulting mixture agitated to form emulsions. This result is all the more surprising as many of the compounds are only very slightly soluble, in either phase.

DESCRIPTION OF THE PREFERRED EMBODIMENTS

Starting Materials: The starting materials for the present invention are a metal cyanate, XCN, and organic diisocyanate, OCN—R—NCO, e.g., tolyene diisocyanate manufactured by Mobay Chemical Company, and a quenching agent.

Figure 1:
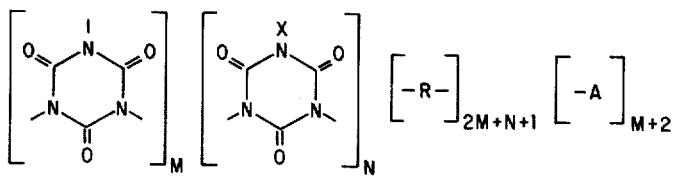
FIG. 1 shows the general formula of the products of the present invention.

Quenching Agent: The nature of end group A in the product shown in FIG. 1, is determined by the reagent employed to quench the NCO end group following the reaction of a diisocyanate with a metal cyanate. Thus:

1. alcohol e.g., methanol, ethanol, proponol, butanol, pentanol, or benzyl alcohol

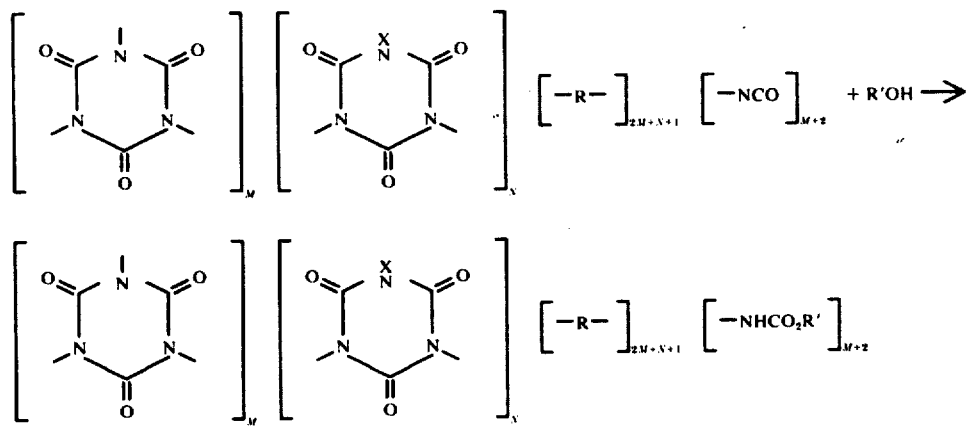

2. amine e.g., methyl amine, ethyl amine, piperdine, isobutyl amine, or morpholine

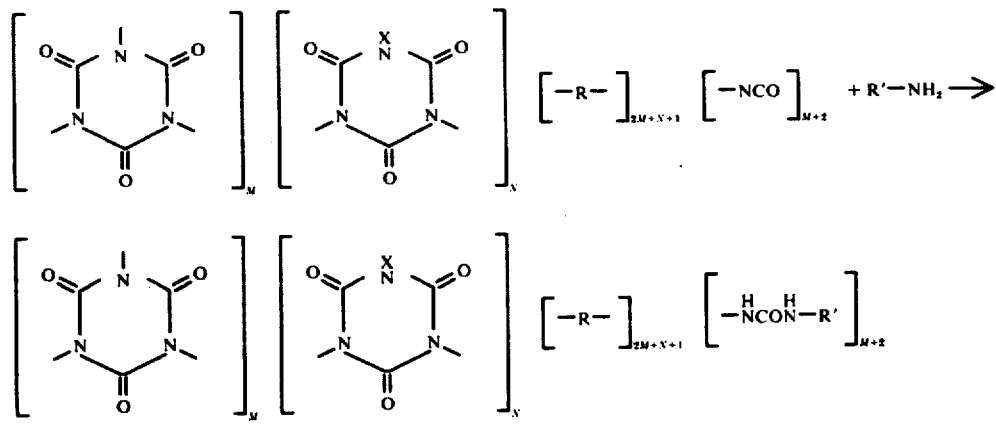

3. secondary amine: e.g., dimethyl amine, dicyclohexyl amine, or methyl-pentyl amine.

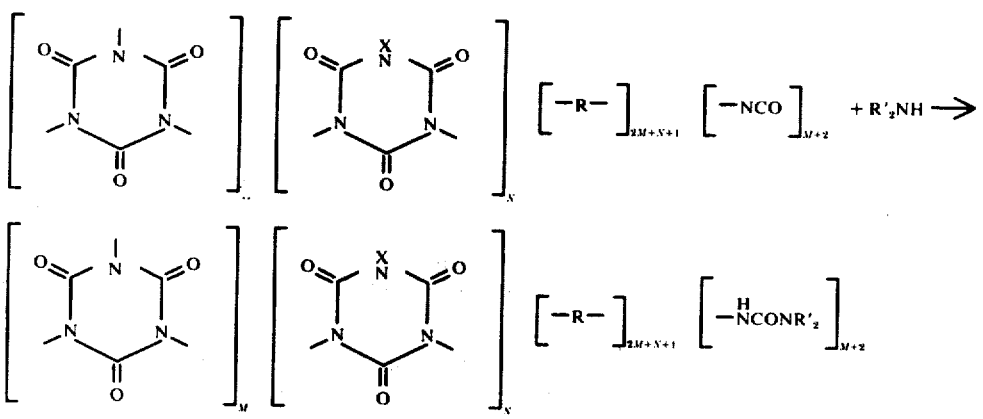
4. water:
6. mercaptan: e.g., methyl mercaptan, butyl mercaptan, or p-thio-cresol.
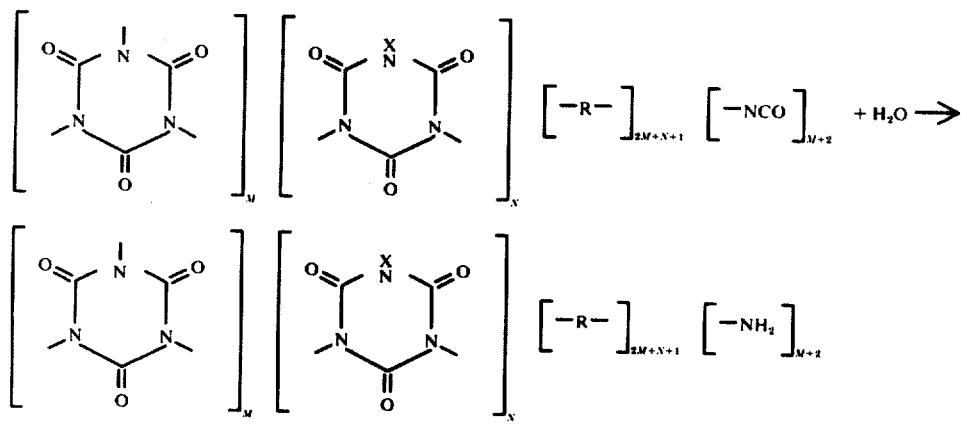
5. organic acid: e.g., acetic acid, benzoic acid, or caproic acid;
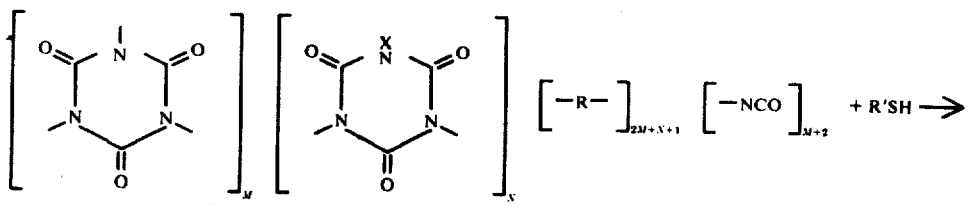

-continued

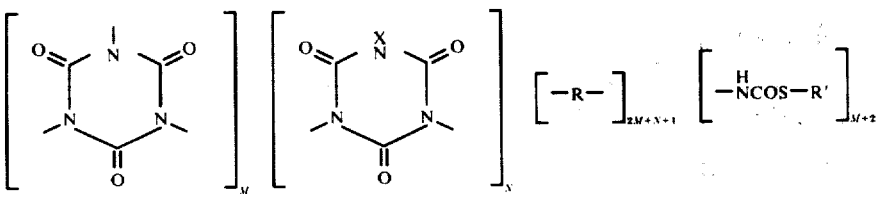

Temperature: While not narrowly critical, temperatures in the range of from 10 to about 200° C. are preferred, with 15°–150° C. being more preferred and 20°–120° C. being most preferred. The lower limit is generally the freezing point of solution and the upper limit is generally the boiling point of the solution at the reaction pressure.

Pressure: While not narrowly critical, the reaction can be carried out at pressures of from 0.5 to 100, with 0.6 to 50 being more preferred, and 0.7 to 10 atmospheres being most preferred.

Time: The reaction time, of course, is dependent on the initial concentration of the starting materials and the temperature. The preferred time is from 0.01 to 4500 hours, more preferred 0.05 to 350 hours, and most preferred from 0.06 to 200 hours.

Examples:

EXAMPLE I

Preparation of Polyisocyanurate Salt

To a stirred sluury of 82.4 KOCN (1.02 mole) in 2000 ml of dimethylformamide (DMF) at 75° C. 183g of tolylene diisocyanate (1.05 mole) is added at a rate of 0.85 ml/min. by means of a syringe pump.

The entire operation is carried out in a nitrogen atmosphere. Following the addition, the reaction mixture is stirred an additional 10 minutes, the temperature lowered to 60° C., dry methanol added (large excess) and allowed to react for an additional hour to insure complete quenching. The major product is insoluble in DMF and thus readily separated by a single filtration. A trace DMF soluble product is obtained after solvent stripping the filtrate. After vacuum drying at 80° C. to remove residual DMF and methanol, the following yield and analytical data are obtained:

| Product | % Yield[1] | Aryl/end Group[2] Ratio (2M+N+1/M+2) | Average Mol. Wt. (Minimum) |
|---|---|---|---|
| DMF insoluble[3] | 87.0 | 14.5 | 8,000 |
| DMF soluble | 12.0 | 1.5 | 750 |

[1]corrected for residual DMF
[2]measured by nuclear magnetic resonance spectroscopy
[3]contains 20.9% DMF of solvation.

EXAMPLE II

Six gallons of anhydrous (less than about 200 ppm water) dimethylformamide (DMF) are charged to a 10-gallon, glass-lined reactor manufactured by the Pfaudler Company. Nine hundred and thirty-six grams (11.55 moles) of potassium cyanate (KOCN) hammer-milled to pass through 325 mesh are added. The mixture is heated to 165°–170° F. (75° C.) while stirring to maintain good mixing. One thousand seven hundred and twenty-six milliliters (12.02 moles) of tolylene diisocyanate (TDI) manufactured by Mobay Chemical Company and designated "Grade A 80/20 mixture" is added to the reactor at a rate of approximately 13.5 milliliters per minute, requiring about 128 minutes total for the TDI addition. Ten minutes after addition of the TDI is completed, 3,000 milliliters of methanol is added to dilute the reaction mixture and stop the reaction. The temperature is then maintained at 165°–170° F. (75° C.) with stirring for three additional hours. Thereafter, the reaction mixture is cooled to room temperature and filtered (centrifugation may be used instead). The solids are then dried at 175° F. (80° C.).

EXAMPLES III – VIII

The utility of the polyisocyanurate salt of Example I as an emulsifying agent is demonstrated in the following manner.

To a graduate, is added 10 ml of n-heptane and 10 ml of water (deionized and distilled) containing from 20–0.5 weight percent of the polyisocyanurate salt described in Example II. Subsequent shaking provides a stable emulsion having the volume indicated in Table 1.

Table 1

| Example No. | Emulsion Phase (ml) | Water Phase (ml) | Oil Phase (ml) | Polyisocyanurate Salt Concentration |
|---|---|---|---|---|
| III | 10.9 | 7.0 | 2.1 | 20% |
| IV | 11.1 | 7.7 | 1.2 | 10% |
| V | 4.4 | 9.2 | 6.4 | 5% |
| VI | 4.2 | 9.2 | 6.6 | 2% |
| VII | 2.7 | 8.7 | 8.6 | 1% |
| VIII | 0.8 | 10.2 | 9.0 | 0.5% |

EXAMPLE IX

When Examples I and III are repeated, except that in repeating Example I an equimolar quantity of ethanol is substituted for the methanol, 7.1 mls. of a water bottom layer is produced. No top layer is formed.

EXAMPLE X

When Examples I and III are repeated, except that in repeating Example I an equimolar quantity of propanol is substituted for the methanol, 6.4 mls. of a water bottom layer is produced. No top layer is formed.

EXAMPLE XI

When Examples I and III are repeated, except that in repeating Example I an equimolar quantity of butanol is substituted for the methanol, 4.0 mls. of a water bottom layer is produced. No top layer is formed.

Modifications of the Invention

It should be understood that the invention is capable of a variety of modifications and variations which will be made apparent to those skilled in the art by a reading of the specification and which are to be included within the spirit of the claims appended hereto.

What is claimed is:

1. A composition comprising a mixture of compounds containing in a single molecule isocyanurate and metal isocyanurate, and having the general structure

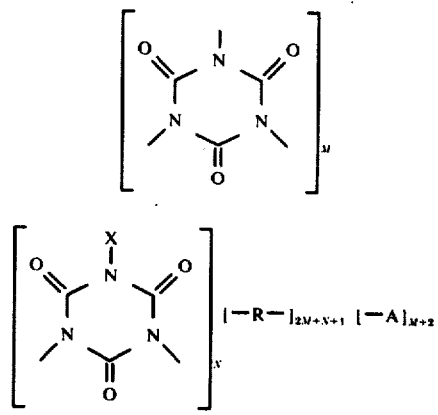

wherein
R = divalent hydrocarbon or substituted hydrocarbon radical, containing 2 to about 40 carbon atoms,
X is selected from the group consisting of metals, or quaternary ammonium radicals,
A is a monovalent organic radical selected from the group consisting of $-NHCO_2R'$, $-NHCONHR'$, $-NH_2$, $-NHR'$, and $-NR'_2$,
R' is a monovalent hydrocarbon radical or substituted hydrocarbon radical containing from 1 to about 40 carbon atoms,
M is the average number of trisubstituted isocyanurate rings per molecule and is a positve integer from zero to about 400,
2M+N+1 = the average number of divalent R groups and is a positive integer from 2 to about 11,000, and wherein
M+2 is the average number of A groups and is a positive integer from 2 to about 400, and wherein there are no N-to-N bonds, No A-to-N bonds, no A-to-A bonds and no R-to-R bonds,
N is the average number of isocyanurate salt groups and is a positive integer from 1 to about 10,000, are useful emulsifying agents.

Figure 2:
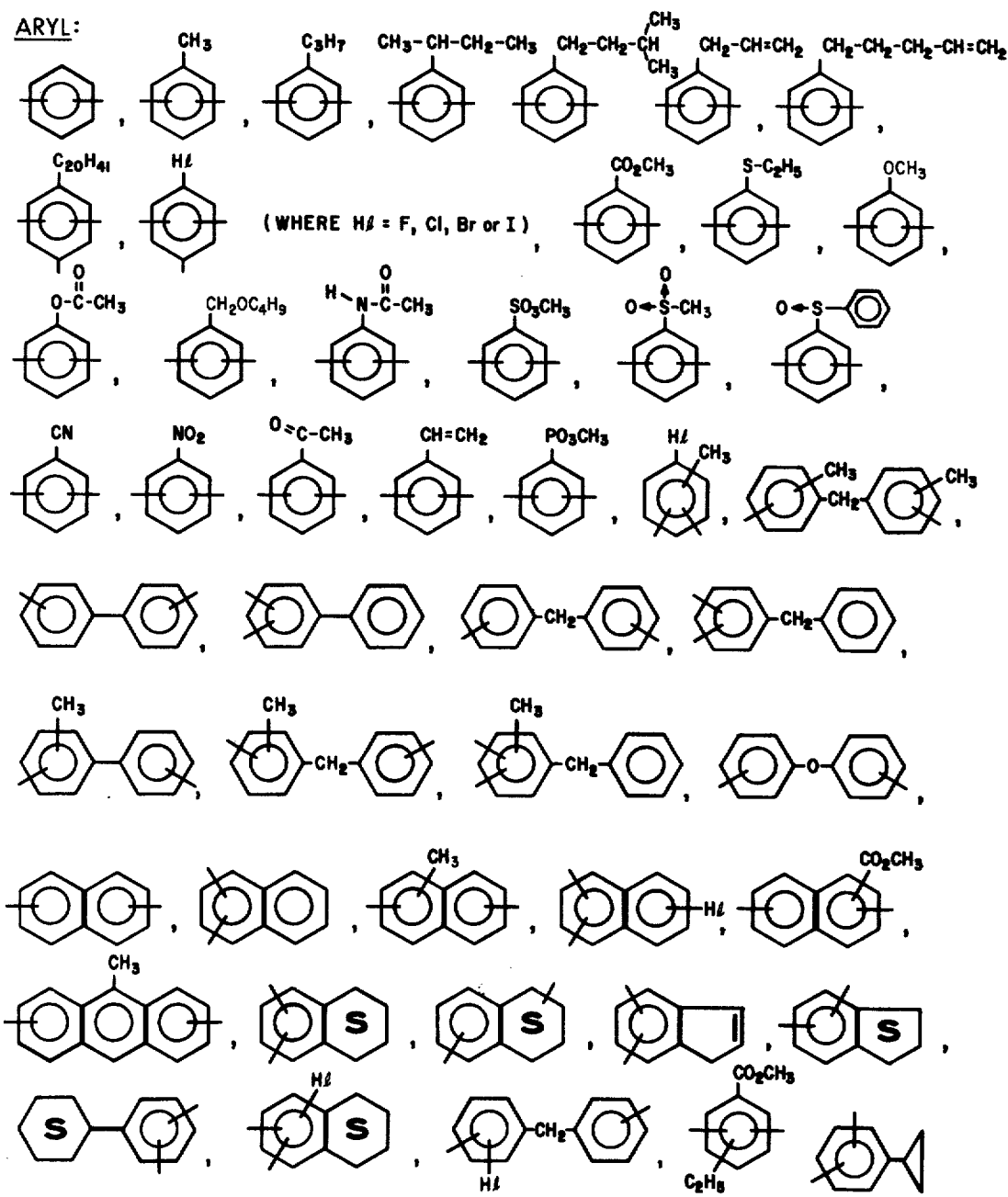
FIGS. 2 and 3 exemplify some of the possible structures of R groups of the starting materials and products of the present invention.
Figure 3:
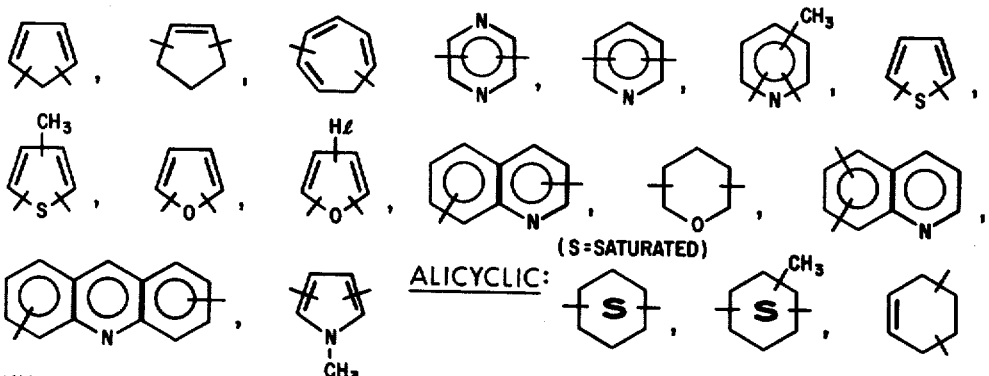

2. A composition according to claim 1 wherein R is selected from the group of organic radicals shown in FIG. 2.

3. Emulsifiers according to claim 1 wherein X is selected from the group consisting of quaternary ammonium radicals and metal radicals selected from the following groups of the Periodic Table, Ia, Ib, IIa, IIb, IIIa, IIIb, IVa, IVb, Va, Vb, VIa; including such metals as Li, Na, K, Rb, Cs, Ca, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

4. Emulsifiers according to claim 1 wherein M is a positive integer from 0 to about 200, and N is from 2 to about 100, and wherein 2M+N+1 is a positive integer from 3 to about 500, and wherein M+2 is a positive integer from about 2 to about 200.

5. Emulsifiers according to claim 1 wherein R is selected from the group of organic radicals shown in FIG. 2 and the substitute derivatives thereof which are substituted with radicals selected from the group consisting of $-NO$, Cl, F, Br, I, CN, $-CO_2R''$, $-CO-R''$, $-O-R''$, $-SR''$, $NR_2''$, $-CONR_2''$, $-SO_3R''$, $-SO_2-$, $-SO-$, phenyl naphthyl, $PO_3R''$, cyclohexyl, cyclopropyl, polymethylene, $-OCOR''$ and

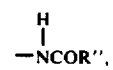

where R'' may be hydrogen or lower alkyl or aryl.

6. A composition according to claim 1 wherein R' contains from 1 to 10 carbon atoms and is selected from the group consisting of

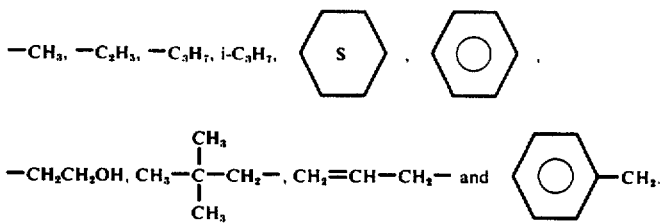

7. An emulsion comprising both water and at least one emulsifier according to claim 1.